United States Patent
Guth et al.

(10) Patent No.: US 9,069,812 B1
(45) Date of Patent: Jun. 30, 2015

(54) METHOD AND APPARATUS FOR ASSEMBLING A BUSINESS DOCUMENT

(75) Inventors: David Guth, Matthews, NC (US); Peter J. Lasne, Matthews, NC (US); Andrea B. Magnuson, Salisbury, NC (US); Kellie A. Bickenbach, Mooresville, NC (US)

(73) Assignee: Bank of America Corporation, Charlotte, NC (US)

( * ) Notice: Subject to any disclaimer, the term of this patent is extended or adjusted under 35 U.S.C. 154(b) by 426 days.

(21) Appl. No.: 13/096,007

(22) Filed: Apr. 28, 2011

(51) Int. Cl.
*G06F 17/30* (2006.01)

(52) U.S. Cl.
CPC .................. *G06F 17/30386* (2013.01)

(58) Field of Classification Search
CPC ................ G06F 17/30395; G06F 17/30386
USPC ......................................................... 707/804
See application file for complete search history.

(56) References Cited

U.S. PATENT DOCUMENTS

| 7,275,053 B1* | 9/2007 | Gardner et al. ........................ 1/1 |
| 2006/0136513 A1* | 6/2006 | Ngo et al. ..................... 707/203 |
| 2008/0294680 A1* | 11/2008 | Powell et al. ................. 707/102 |
| 2009/0018996 A1* | 1/2009 | Hunt et al. ........................ 707/2 |

* cited by examiner

*Primary Examiner* — Huawen Peng
(74) *Attorney, Agent, or Firm* — Weiss & Arons LLP; Michael A. Springs, Esq.

(57) ABSTRACT

A method for creating an integrated business document with updates is provided. The method may include creating at least one input document. Input documents may be comprised of assets. Assets may be data presentation items such as graphs, charts or tables. Source documents may be stored in an asset library. Software may be used to construct an integrated business document which may be in the form of slides. The software may be augmented by a plug-in. The plug-in may provide access to assets from the asset library. The plug-in may allow the user to select assets and integrate them into a business document. The integrated business documents (or slides) may be stored in a presentation library. The presentation library may allow a user to update the assets in the integrated business document using currently available data.

21 Claims, 6 Drawing Sheets

METHOD AND APPARATUS FOR ASSEMBLING A BUSINESS DOCUMENT

FIELD OF TECHNOLOGY

Aspects of this disclosure relate to providing methods and apparatus which assemble a business document.

BACKGROUND OF THE INVENTION

A business document may present data from a variety of sources in a comprehensive yet compact form. Different forms of presentation may be used—e.g., slides produced by PowerPoint® software. The information described by the document may come from a variety of data sources and tools. The data may change over time, requiring changes to the documents that depend on that data.

Some of the drawbacks associated with producing documents on a regular basis are integration and timeliness. Documents may depend on disparate data sources and the underlying data may change. It would be desirable, therefore, to provide apparatus and methods that provide integrated business documents that may be easily constructed from disparate data sources. It would also be desirable to allow documents to be updated when data changes without rewriting the document.

SUMMARY

Systems and methods are preferably provided for:

a) Creating input documents and associated representations.

b) Creating an asset library of input documents comprising assets, where an asset may be a data representation.

c) Creating an integrated document that integrates assets.

d) Creating a presentation library of integrated documents.

e) Updating the integrated documents in the presentation library when the data or assets change.

The integrated documents may be produced by presentation software. The systems and methods may include a computer. The computer may include a display screen and a keyboard. Often a mouse or other pointing device—e.g., a trackball—is provided as well. The computer may be connected to the Internet. The software may provide one or more views of documents to the user. The software may be augmented by an asset browser plug-in platform.

Although a full-size, or laptop, computer may run the presentation software, other devices are also suitable and included within the scope of the invention—e.g., a PDA, iPhone®, Smartphone, iPad®, Blackberry®, 3G phone, 4G phone or custom hardware.

Although some of the description of the input documents and the integrated documents utilize PowerPoint® slides as a presentation method, other methods such as charts, spreadsheets and textual reports are contemplated and included within the scope of the invention. For the purposes of this application, the term slide may refer to a portion of any business document. The presentation of data may be in the form of a business document but other documents—e.g., academic reports—are contemplated and included within the scope of the invention.

The systems and methods according to the invention may receive and store in an asset library, slides, and assets from slides, charts, tables or spreadsheets. The software may further incorporate assets into slides from various sources or persons. The assets may or may not conform to a known template. An asset browser plug-in platform according to the invention may provide access to an asset library. The user may integrate one or more assets from the library in a particular slide. The slides may be stored in a presentation library. The slides in the presentation library may be updated.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for creating an asset library of input documents—e.g., Microsoft Word®, Excel® or PowerPoint® documents are provided. The documents may be comprised of assets—e.g., charts, graphs etc. A plug-in software module may allow the user to select and use assets from the asset library. The selected assets may be used to construct an integrated business document, also called an integrated document or a slide. The integrated documents may be stored in a presentation library. If the underlying data of assets change, the integrated documents in the presentation library may be updated.

Documents are often created using readily available software—e.g., Microsoft Word®, Excel® or PowerPoint®. Although some or all of the embodiments in this description refer to PowerPoint® slides, other software or any sort of presentation tool—e.g., Open Office—is contemplated and included within the scope of the invention.

It would be desirable, therefore, to provide apparatus and methods that provide an interactive and intuitive mechanism for creating integrated documents. It would also be advantageous if the integrated documents could be updated when the information underlying the sources change.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, flash memory, and/or any combination thereof. In addition, various signals representing data or events as described herein may be transferred between a source and a destination in the form of electromagnetic waves traveling through signal-conducting media such as metal wires, optical fibers, and/or wireless transmission media—e.g., air and/or space.

Figure 1:
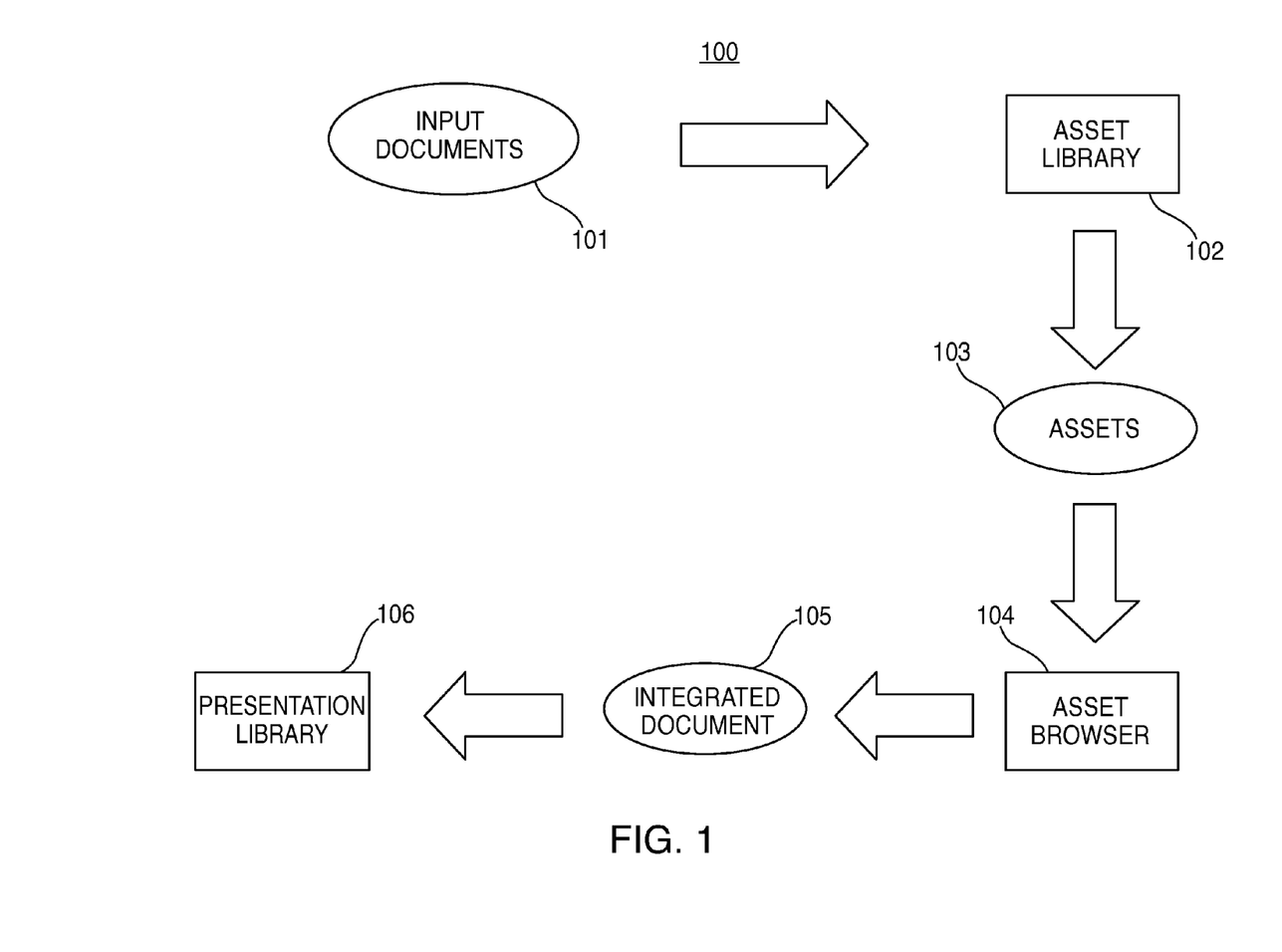
FIG. 1 shows a flow diagram of a system which may provide input documents which may comprise assets which may be assembled into slides.

FIG. 1 is a schematic diagram of system 100 which creates and maintains an integrated document. System 100 is one possible embodiment of a system for the creation of integrated documents. Input documents 101 may come from any suitable source—e.g., a spreadsheet. The input documents 101 may be stored in an asset library 102. Asset library 102 is preferably stored on a SharePoint® server. Although a SharePoint® server is preferred any suitable library mechanism—e.g., files stored in a directory—is contemplated and included within the scope of the invention.

Input documents 101 may be comprised of different file types—e.g., Excel® spreadsheets, flat text files or PowerPoint® files. Each format may have different versions—e.g., Excel® files may be of the type .xls or .xlsx. Preferably these files are constructed as an eXtensible Markup Language (XML) files or any other suitable format. Binary file formats are contemplated and are included within the scope of the invention. Each file type may require different processing via a handler—e.g., an ASHX handler. A specific ASHX handler may be created for each file type used as an input document 101.

Assets 103 may be extracted from the input documents in the asset library. An asset browser platform 104 presents the assets 103 to a user. The user may select one or more assets 103 and place it in an integrated document 105. The integrated document 105 may be a slide. The integrated documents are stored in a presentation library 106.

Each input document 101 may be tagged according to a category. Categories may indicate the type of integrated document 105 that will make use of the input document 101. The input documents 105 may also be tagged. Preferably a user will specify a category when the integrated document 105 is created. An input document 101 and an integrated document 105 may be placed in more than one category. When a user is offered a selection of assets, the selection may comprise only assets 103 from documents 101 that match the category of the integrated document 105. In the alternative, the assets 103 may be tagged according to a category or categories.

Integrated documents in presentation library 106 may be comprised of assets 103 or they may be comprised of other assets and data, or a combination of assets 103 and other assets and data.

The system 100 may implement a Product Data Management (PDM) workflow. A PDM may use software to track and control data related to a particular product—e.g., a business document. The data tracked may relate to technical information within the business document.

Figure 2:
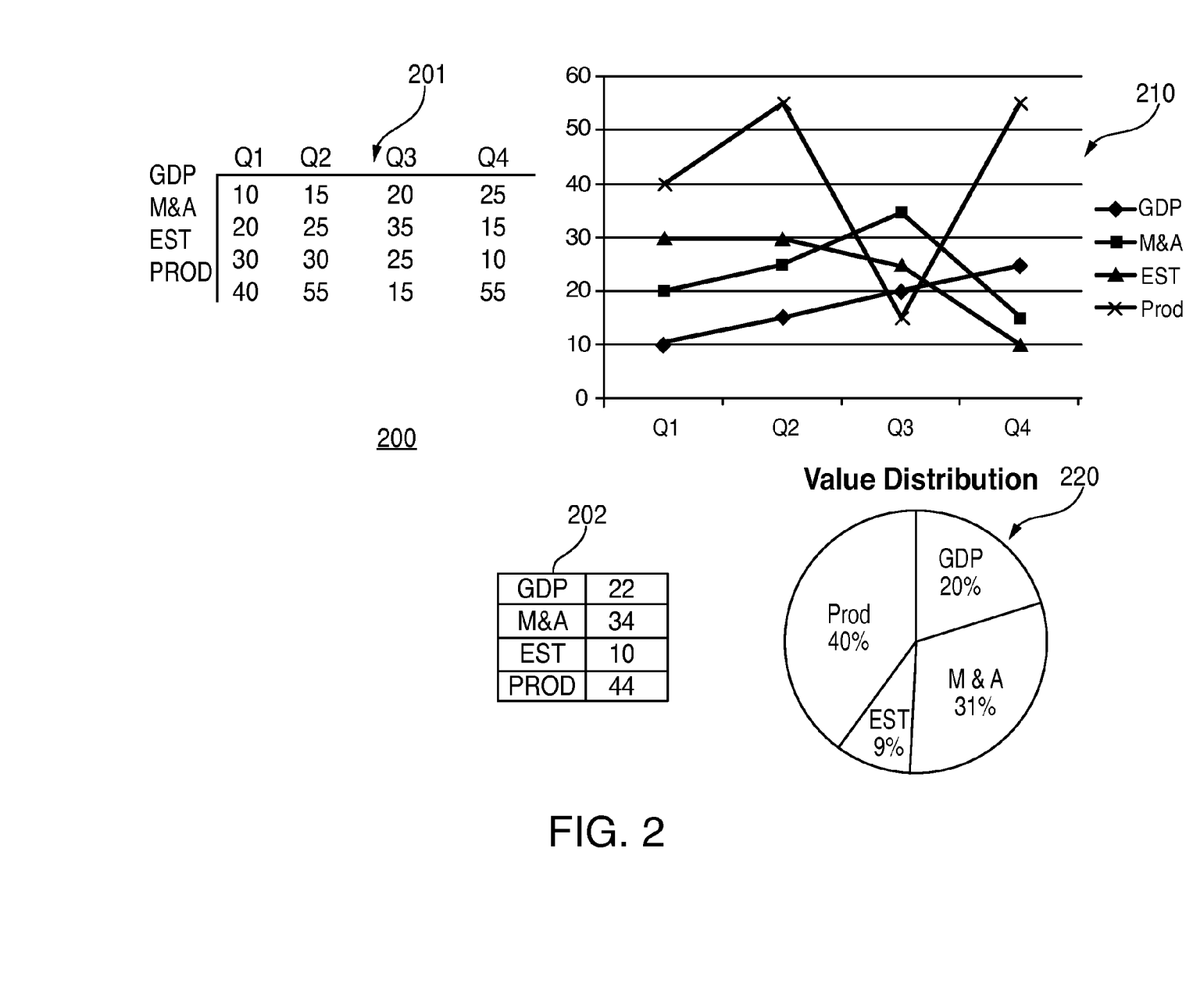
FIG. 2 shows an example set of assets.

FIG. 2 shows example input document 200. Example input document 200 is an Excel® worksheet. Example input document 200 comprises a table 201, a graph 210, a table 202 and a pie chart 220. Each of the tables, graphs and charts is an example of assets 103 that may be accessed by the asset browser platform 104. Example assets 103 may be constructed using any suitable software product—e.g., Microsoft Word®, Excel® or PowerPoint®.

Example input document 200 may be parsed to locate assets 103—e.g., to discern that graph 210 is a different asset than pie chart 220. Location of assets 103 within example input document 200 allows the creation of an asset library where each asset is distinct. Assets 103 may be linked to other assets 103 or data—e.g., table 201 is the data for the creation of graph 210. Assets 103 that have linking data may be stored with the links to that data or the data and the pictorial expression of the data. Such pictorial expression may include a graph or pie chart which may be stored as a single asset 103. If the linking data is changed, the pictorial expression of that data may change as well.

Figure 3:
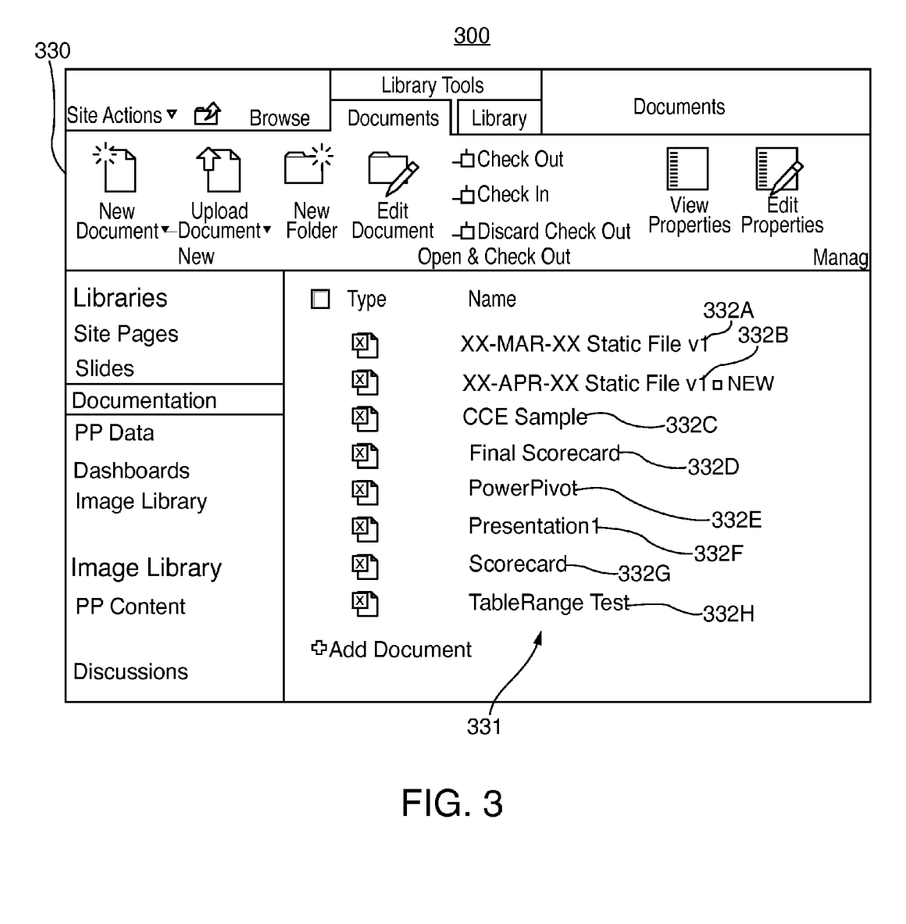
FIG. 3 shows an example asset library comprising input documents.

FIG. 3 shows an example embodiment 300 of the asset library 102 within a SharePoint® interface. Example asset library 300 comprises a user interface 330 and a list of documents 331. The documents are labeled 332A-332H. Documents 332A-332E, 332G and 332H may be Excel® work sheets. Document 332F may be a PowerPoint® slide set. Any other suitable documents may be included within the example asset library 300.

Asset library 102 may be shared among many users. The asset library 102 may implement security features, limiting access to portions of the asset library 102 for some of the users. Asset library 102 may organize the assets according to asset type, document type or any other suitable organization.

Figure 4:
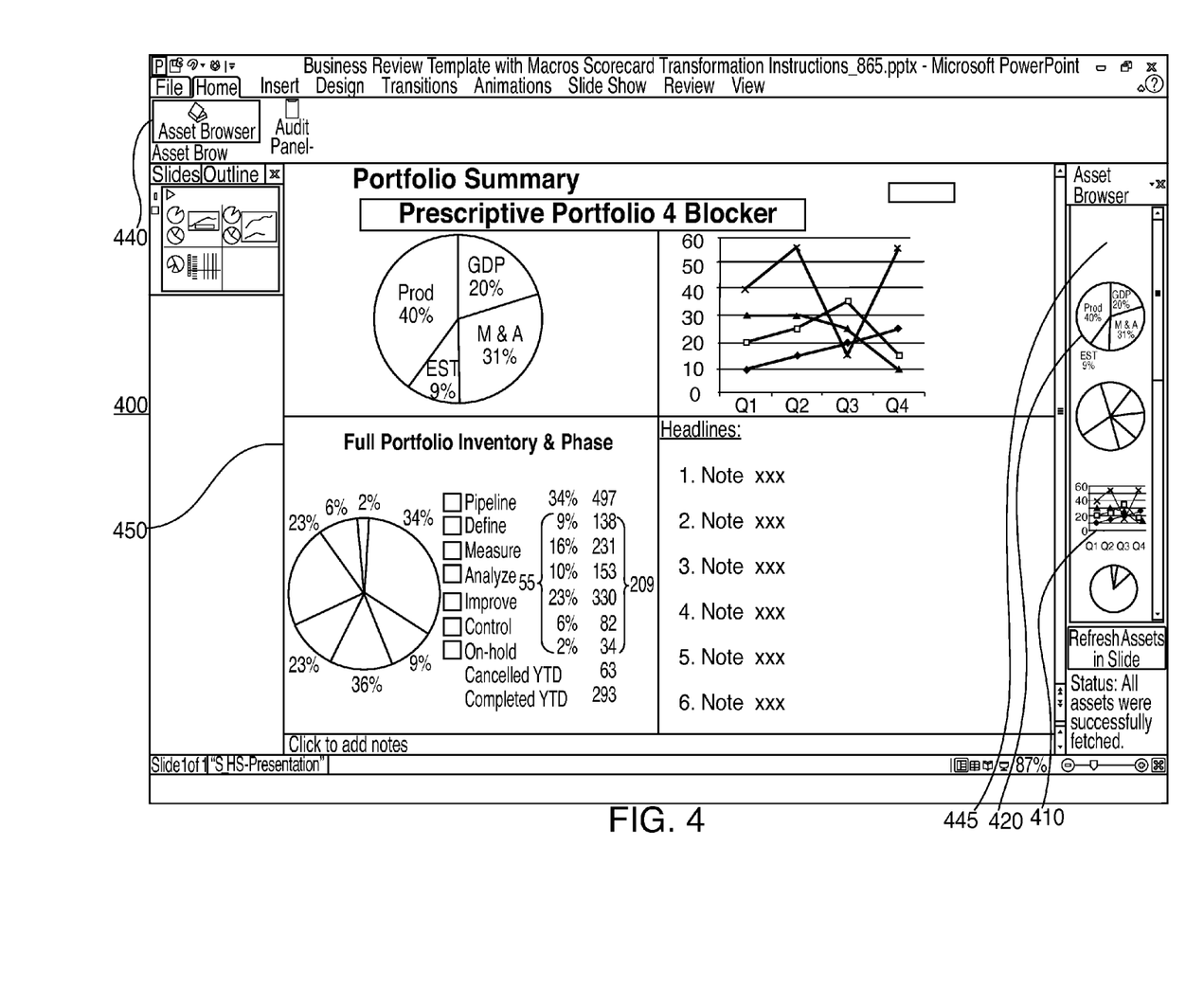
FIG. 4 shows an asset browser panel for a plug-in, where the plug-in allows the selection and use of assets from documents in the asset library.

FIG. 4 shows an example user interface 400 that allows a user to integrate assets 103 into an integrated document 450. Integrated document 450 may be in the form of a PowerPoint® slide. User interface 400 is a PowerPoint® interface showing a typical "ribbon" menu which includes a plug-in icon 440 for an asset browser platform. The icon 440 may be used to activate the asset browser platform. The asset browser may be in the form of a custom plug-in. The plug-in may or may not be part of the typical installation of the presentation software—e.g., PowerPoint®.

The interface includes an asset browser panel 445. Asset browser platform 445 may contain a manifest of assets. Preferably the assets are retrieved from a shared library stored on a SharePoint® server. Example assets within asset browser platform 445 are example graph 410 and example pie chart 420. The retrieval and sorting of assets may be based on a metadata tag. The metadata tag may be part of the integrated document or part of the input document which is the source of the asset.

Although example interface 400 utilizes a slide paradigm with an asset browser panel, other embodiments of the example interface 400 are contemplated and included within the scope of the invention—e.g., a text document utilizing a drop down menu of assets.

Figure 5:
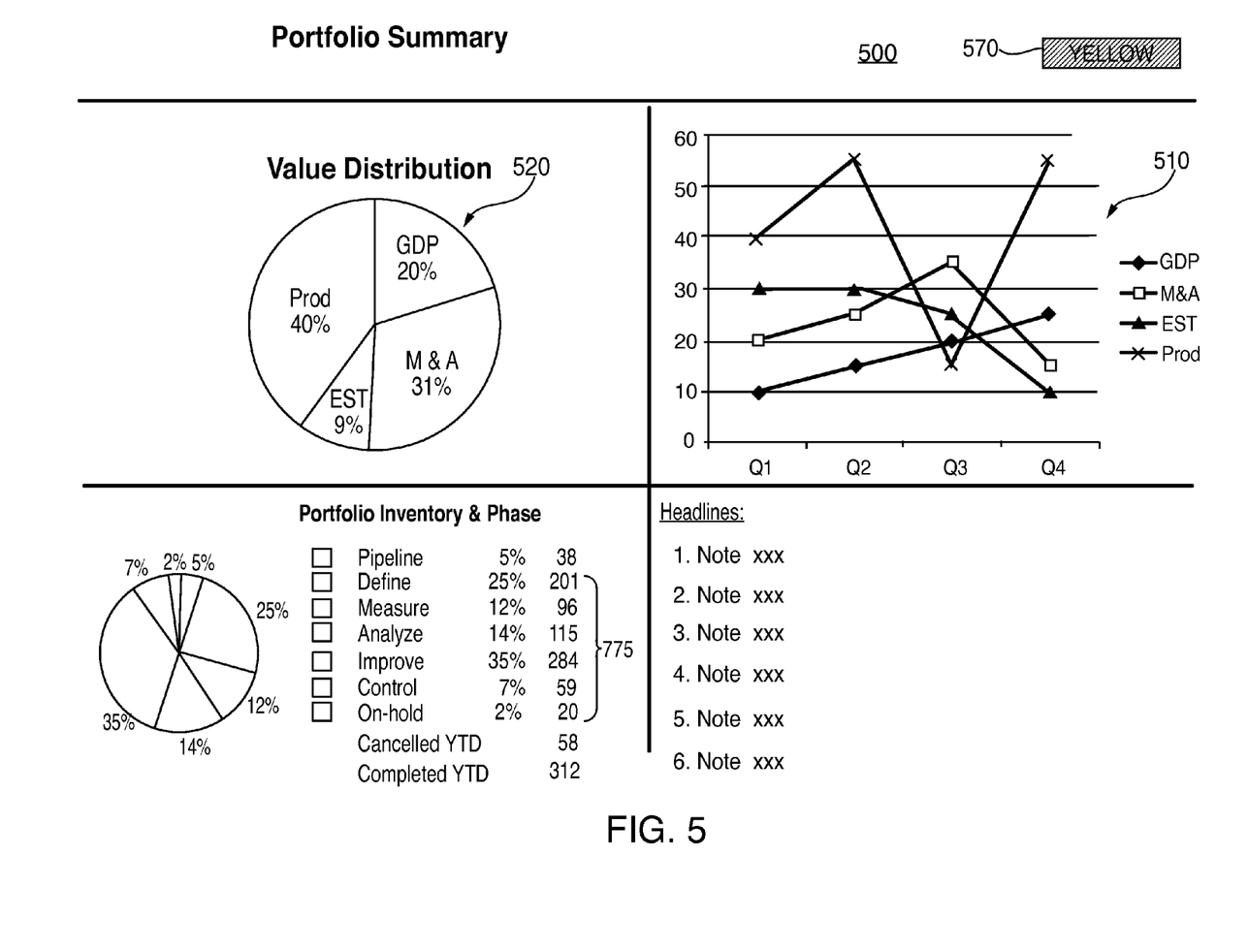
FIG. 5 shows an exemplary integrated document.

FIG. 5 shows an exemplary slide 500 comprising some exemplary assets. An exemplary graph 510 appears in the upper right of slide 500. An exemplary pie chart 520 appears in the upper left of slide 500. Slide 500 may be stored in a presentation library 106.

The exemplary graph 510 and exemplary pie chart 520 may have been placed into the slide 500 by the asset browser platform. Some or all of the assets may be updated or refreshed when the presentation is opened by the software. In the alternative, an update may be triggered by the user. An exemplary color status indicator 570 may be placed in the upper right hand corner of the exemplary slide 500.

Figure 6:
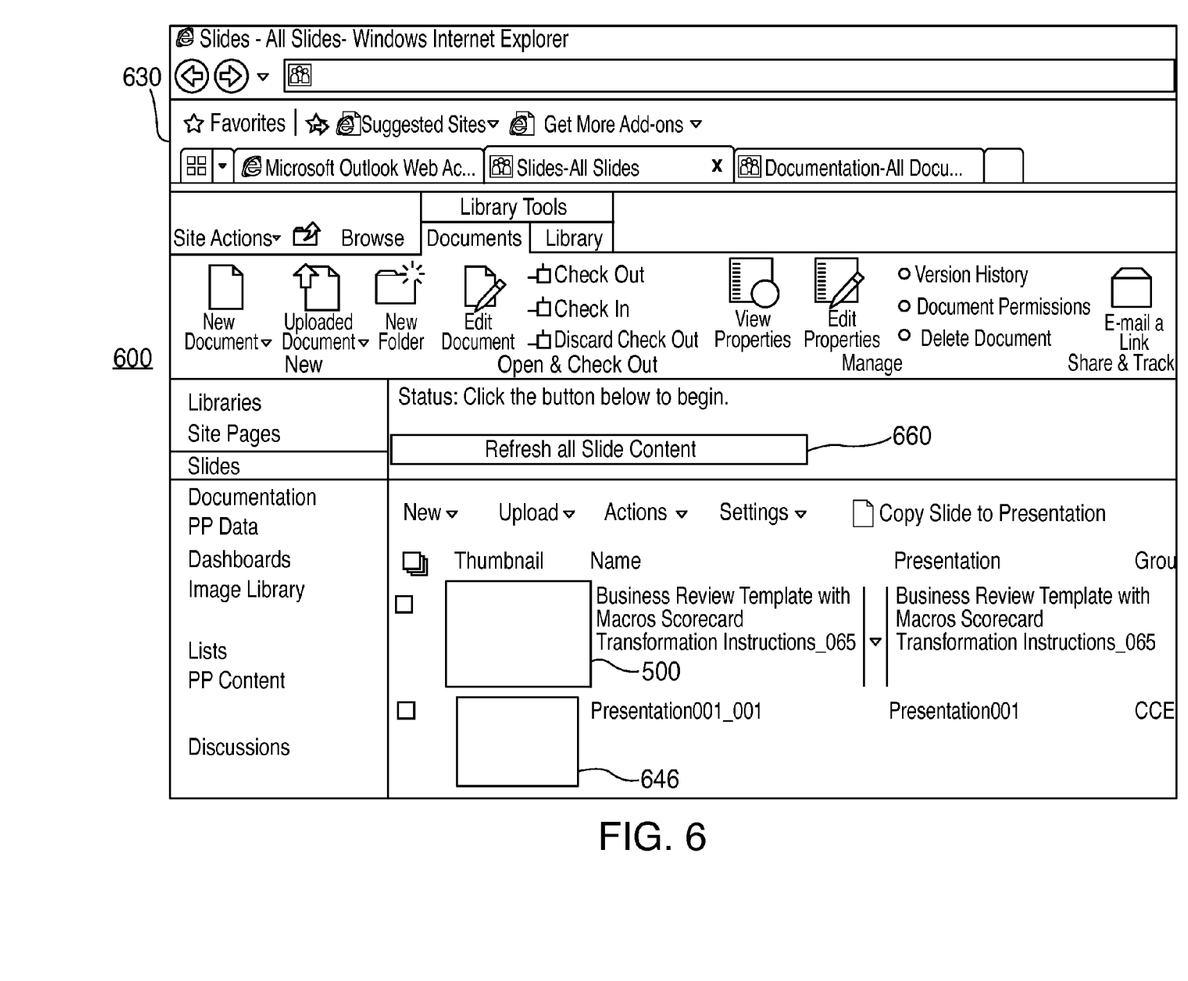
FIG. 6 shows a presentation library of integrated documents which may be updated.

FIG. 6 shows an example embodiment 600 of the presentation library 106 within a SharePoint® interface. Example presentation library 600 comprises a user interface 630 and a slide list 646. Example slide 500 appears in slide list 646. The slides in slide list 646 may be PowerPoint® slide sets. Any other suitable document type may be included within the example embodiment 600.

Presentation library 106 may be shared among many users, which may enable construction of composite documents utilizing slides from presentation library 106. The presentation library 106 may implement security features, limiting access to portions of the presentation library 106 for some of the users. Presentation library 106 may organize the assets according to date, document type or any other suitable organization.

Presentation library may be updated via user interface button 660. Although example embodiment 600 of the presentation library 106 shows an update button 660, any other suitable update method or methods—e.g., updates on a change of data or when an integrated file is opened—are contemplated and included within the scope of the invention. Updating may use linking data.

Updating presentation library 106 has the affect of updating each asset within some or all of the integrated documents according to the most current available data. An example update would create a new net worth calculation for a client when the stock market closes according the value of all assets held by the client. Likewise risk management, predicting currency fluctuations etc. may be used to update slides.

Some or all of the integrated documents 105 may comprise metadata tags. The metadata tags may permit updating of a part of an integrated document—e.g., a slide. As an example a metadata field could be "color status"—e.g., the state of the exemplary color status indicator 570 of exemplary slide 500. If color status were changed to red, the update process would look at the color status indicator and change it to the appropriate image—e.g., from a yellow bar to a red bar. Thus, the metadata tags permit changes to the input documents 101 underlying an integrated document 105 without affecting the presentation until an update is requested. At any time the integrated documents 105 may be updated to the newer information.

Updating integrated documents may utilize a ReprEsentational State Transfer (REST) protocol, but any suitable protocol may be used. Updates triggered in the presentation library 106 may also trigger an update of assets 103 or documents 101 stored in asset library 102.

Thus, an apparatus that enables integration of assets from a variety of sources into a integrated document have been presented. Likewise, updating of integrated documents in a presentation library with current data has also been presented. Persons skilled in the art will appreciate that the present invention can be practiced by other than the described embodiments, which are presented for purposes of illustration rather than of limitation, and that the present invention is limited only by the claims that follow.

What is claimed is:

1. A business document aggregation system comprising:
   a plurality of spreadsheets,
   wherein, at least one spreadsheet included in the plurality of spreadsheets is created by a first user using Microsoft Excel software;
   wherein the at least one spreadsheet is tagged with a category by the first user;
   wherein the at least one spreadsheet comprises at least one asset located within the at least one spreadsheet, said at least one asset comprising at least one of a chart, graph or other display of information created by the first user;
   a memory configured to store execution instructions, the plurality of spreadsheets and the at least one asset; and
   a processor coupled with the memory, the processor configured to execute the instructions, the instructions configured to cause the processor to:
   detect a creation, by a second user using Microsoft PowerPoint software, of a slide presentation tagged by the second user with the same category as the at least one spreadsheet from the plurality of spreadsheets;
   in response to the creation of the slide presentation, display an asset library to the second user, said asset library being tagged with the same category as the at least one asset created by the first user, said asset library including the at least one asset, said at least one asset being displayed in the asset library, based on metadata;
   provide a platform within the Microsoft PowerPoint software for the inclusion of the at least one asset created by the first user in the slide presentation created by the second user; and
   update, utilizing ReprEsentational State Transfer ("REST") protocol, the at least one asset included in the slide presentation created by the second user:
   after information associated with the spreadsheet created by the first user has been altered; and
   after receiving an update request corresponding to the at least one spreadsheet by the second user.

2. The systems of claim 1, wherein the at least one asset is located within the at least one spreadsheet by parsing the spreadsheet.

3. The system of claim 1 wherein a first asset is linked to a second asset.

4. The system of claim 1 wherein a first asset depends on data from a second asset.

5. The system of claim 1, wherein the spreadsheet is stored in the asset library.

6. The system of claim 5 wherein the assets are sorted based on metadata.

7. The system of claim 1, further comprising receiving a selection from the second user to include the at least one asset in the slide presentation.

8. The system of claim 1 wherein the instructions are configured to cause the processor to update the at least one asset when the slide presentation is accessed.

9. The systems of claim 5 wherein the slide presentation is stored in a presentation library.

10. The system of claim 1 wherein updating a first asset is based on a second asset.

11. The system of claim 9 wherein the asset library and the presentation library are store on different computers.

12. A method for integrating business documents tagged with categories, the method comprising:
   identifying at least one asset located within at least one spreadsheet, said spreadsheet included in a plurality of spreadsheets, wherein the at least one spreadsheet is created by a first user using Microsoft Excel software and tagged with a category by the first user;
   incorporating the at least one asset into an asset browser plug-in platform;
   storing the at least one asset in an asset library, said asset library comprising a plurality of assets associated with the category;
   receiving a category selection by a second user;
   determining at least one corresponding asset, wherein the category of said corresponding asset corresponds to the category selection;
   displaying at least a portion of the plurality of assets to the second user within the asset browser plug-in platform when the second user accesses Microsoft PowerPoint software;
   in response to a selection of the at least one corresponding asset by the second user, integrating the at least one corresponding asset from the asset browser plug-in platform into a slide created by the second user using the Microsoft PowerPoint software;

detecting a change to the at least one corresponding asset created by the first user; and in response to detecting the change to the at least one corresponding asset, changing, utilizing ReprEsentational State Transfer ("REST") protocol, a color status associated with the slide created by the second user.

13. The method of claim 12 wherein the identifying comprises parsing the spreadsheet to locate the asset.

14. The method of claim 12 wherein a first asset depends on data from a second asset.

15. The method of claim 12 further comprising, displaying the asset based on metadata.

16. The method of claim 15 further comprising, sorting a plurality of assets based on metadata.

17. The method of claim 12 further comprising, storing the slide in a presentation library.

18. The method of claim 17 further comprising updating the asset incorporated in the slide.

19. The method of claim 12, further comprising the updating the asset when the slide is accessed.

20. The method of claim 19 further comprising updating a first asset based on data from a second asset.

21. The method of claim 17 wherein the asset library and the presentation library are stored on different computers.

\* \* \* \* \*